Dec. 19, 1922.
L. L. ROACH.
CULTIVATOR.
FILED FEB. 11, 1921.
1,439,579.
3 SHEETS—SHEET 1.
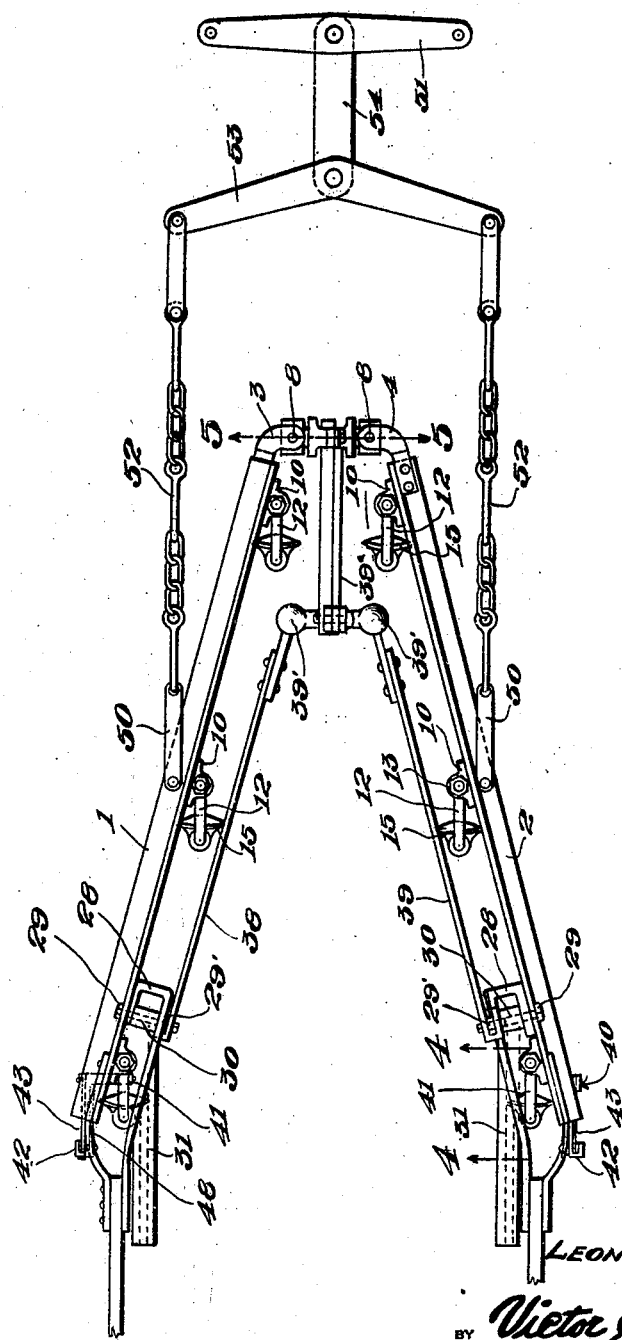
LEONARD L. ROACH.
INVENTOR
BY Victor J. Evans
ATTORNEY Dec. 19, 1922.
L. L. ROACH.
CULTIVATOR.
FILED FEB. 11, 1921.
1,439,579.
3 SHEETS—SHEET 2.
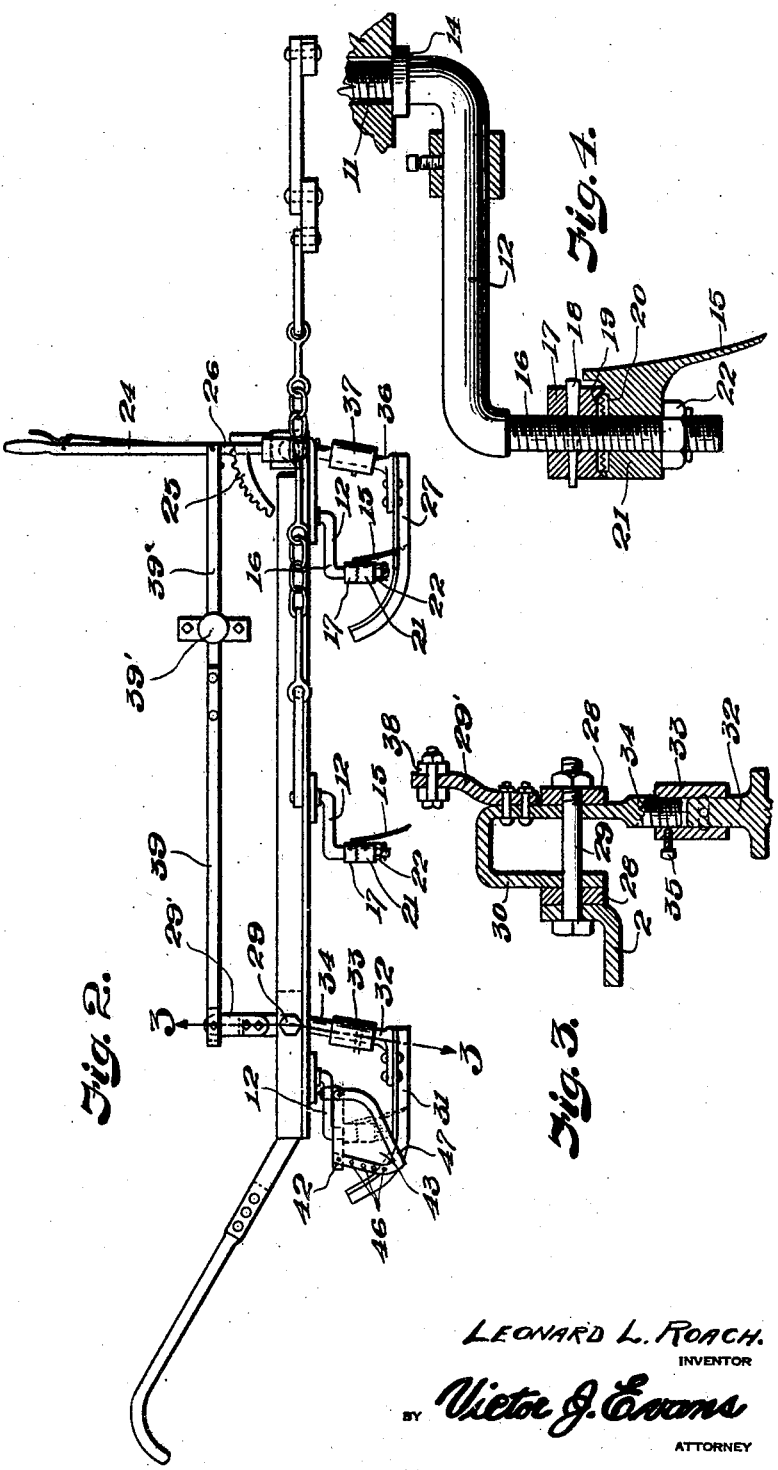
LEONARD L. ROACH.
INVENTOR
BY Victor J. Evans
ATTORNEY

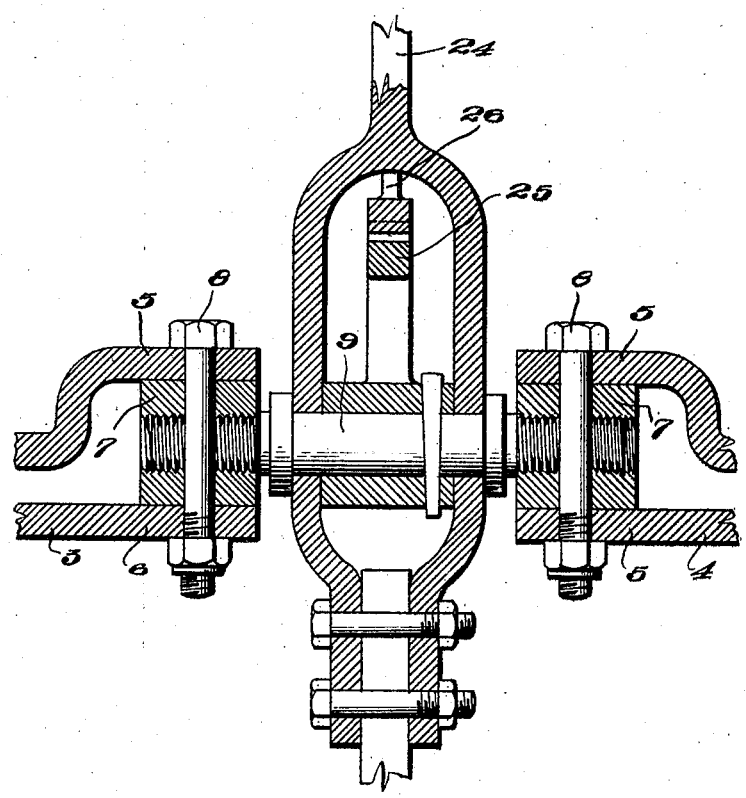

Patented Dec. 19, 1922.

1,439,579

UNITED STATES PATENT OFFICE.

LEONARD L. ROACH, OF GALESBURG, ILLINOIS.

CULTIVATOR.

Application filed February 11, 1921. Serial No. 444,273.

*To all whom it may concern:*

Be it known that I, LEONARD L. ROACH, a citizen of the United States, residing at Galesburg, in the county of Knox and State of Illinois, have invented new and useful Improvements in Cultivators, of which the following is a specification.

This invention relates to cultivators of the type used in gardening or truck farming, and an object of the invention is to provide a cultivator in which the beams are mounted to permit the cultivating of rows of growing plants which are spaced either close together or relatively wide apart and also a cultivator in which the depth of insertion of the shovels into the ground may be regulated as desired.

Other objects of the invention will appear in the following detailed description and in the accompanying drawings wherein:

Fig. 1 is a top plan of the improved fender.

Fig. 2 is a side elevation of the fender.

Fig. 3 is a detailed section of the cultivator taken on the line 3—3 of Fig. 2.

Fig. 4 is a detailed section on an enlarged scale illustrating the manner of mounting the cultivator shovels.

Fig. 5 is a detailed section taken on the line 5—5 of Fig. 1.

Referring more particularly to the drawing the improved cultivator includes beams 1 and 2 to the forward ends of which castings 3 and 4 are attached. The castings 3 and 4 have forked ends providing spaced arms 5 and 6 which engage upon the opposite sides of nuts 7 to which nuts the arms 5 and 6 are pivotally connected by pivoting bolts 8 to permit lateral swinging of the beams 1 and 2.

The nuts 7 are threaded upon the threaded ends of a shaft 9 which connects the forward ends of the beams 1 and 2.

The beams 1 and 2 have socket members 10 attached thereto at spaced intervals along their inner sides corresponding to the distance apart it is desired to space the cultivating shovels.

The socket members 10 receive therethrough the upper threaded ends 11 of the shovel carrying shanks 12 and nuts 13 are mounted on the threaded ends 11 for clamping the collars 14 in engagement with the under surfaces of the socket members 10 to securely hold the shanks 12 against vertical displacement but permit limited rotary movement of the shanks 12 to cause the shovels 15, carried thereby, to swing in line, upon variations of the relative positions of the beams 1 and 2.

The downturned ends 16 of the shanks 12 have collars 17 pinned thereon by suitable pins 18 and the lower surfaces of the collars 17 are serrated as at 19 the said serrations being adapted to co-act with the serrations 20 on the upper surfaces of the attaching bosses 21 on the shovels 15. Nuts 22 are threaded on the ends of the depending portions 16 of the shanks 12 for securely clamping the serrated surfaces of the collars 17 and bosses 21 in engagement to prevent accidental movement of the shovels relative to the shanks 12.

A hand lever 24 is pivotally mounted upon the shaft 9 and it is forked, at its portion adjacent to the shaft, as clearly shown in Fig. 5 of the drawing, to extend over the quadrant 25 which is fixed to the shaft 9 in any suitable manner and co-acts with the dog mechanism 26 for holding the hand lever 24 in adjusted position. A runner 27 is attached to the lower end of the lever 24 beneath the shaft 9 and this runner is substantially T-shaped in cross section, the body thereof adapted to be embedded in the ground to steady and guide, to a certain extent, the movement of the cultivator. By pivotal movement of the hand lever 24 the runner 27 may be rocked to adjust the cultivating depth of the shovels 15.

Brackets 28 are attached to each of the beams 1 and 2 adjacent their rear ends and these brackets have their attached ends substantially U-shaped in plan, as clearly shown in Fig. 1 of the drawings. A bolt 29 extends through each of the brackets 28 and through the adjacent portion of the side of the beam to which the bracket is attached forming a pivotal support for the carrying members 30 of the rear runners 31 which are spaced adjacent to the rearmost shovels 15 of the cultivator structure. The runners 31, are substantially T-shaped in cross section like the runners 27 and have attaching brackets 32 secured thereto in any suitable manner. A collar 33 is carried by each of the brackets 32 and is internally screw threaded to receive the threaded shank 34 of the carrying member 30 for permitting vertical adjustment of the runner relative to the beams of the cultivator. A set screw 35 is provided for locking the collar 33 and threaded shank 34 against adjustment. The front runner 27 is connected to the hand lever 24 in the same manner, namely, by an attaching bracket 36 and collar 37. The carrying members 30 are pivotally mounted upon the bolts 29 and have arms 29' attached thereto which project above the beams 1 and 2 and have bars 38 and 39 connected to their upper ends. The bars 38 and 39 converge and are connected by ball and socket joints 39' to the rear end of the bar 39ᵃ which bar 39ᵃ is connected to the hand lever 24 for rocking the runners 31 in unison with the runner 27 to uniformly regulate the cultivating depth of all the shovels 15.

The ball and socket joints 39' are provided to permit lateral swinging of the bars 38 and 39 in unison with the swinging of the beams 1 and 2.

The hitch of the cultivator is through clevises 50 which are attached to the beams 1 and 2 intermediate the ends of the beams and which have connection with the single tree 51 through flexible connectors 52, a draft beam 53 and link 54 so as to provide proper draft on the beams to cause the shovels 15 to swing into proper alignment with the direction of travel of the cultivator under all adjustments of the beams 1 and 2.

It is, of course, to be understood that the invention may be constructed in various other manners and the parts associated in different relations and, therefore, I do not desire to be limited in any manner except as set forth in the claims hereunto appended.

Having thus described my invention what I claim is:

1. In a cultivator, beams, shovels thereon, forked castings carried by the forward ends of said beams, a cross rod, nuts threaded on the ends of said cross rods, pivoting pins extending through said forked castings and said nuts to permit relative swinging movement of said beams, and shovel depth regulating means carried by said rod.

2. In a cultivator, beams, forked castings connecting the forward ends of said beams, a cross rod, nuts on the ends of said cross rod, pins extending through said nuts and forked members for pivoting said beams to said rod to permit relative swinging movement of said beams, a hand lever having a forked end mounted upon said cross rod, and a shovel depth regulating runner attached to the forked end of said lever.

3. In a cultivator, beams, forked castings connecting the forward ends of said beams, a cross rod, nuts on the ends of said cross rod, pins extending through said nuts and forked members for pivoting said beams to said rod to permit relative swinging movement of said beams, a hand lever having a forked end mounted upon said cross rod, and a shovel depth regulating runner attached to the forked end of said lever, depth regulating runners pivoted to said beams adjacent the rear ends of said beams, and means connecting said last named runners to said lever.

In testimony whereof I affix my signature.

LEONARD ROACH.